(No Model.)
W. McLAUGHLIN.
HEDGE TRIMMER.
No. 322,193. Patented July 14, 1885.
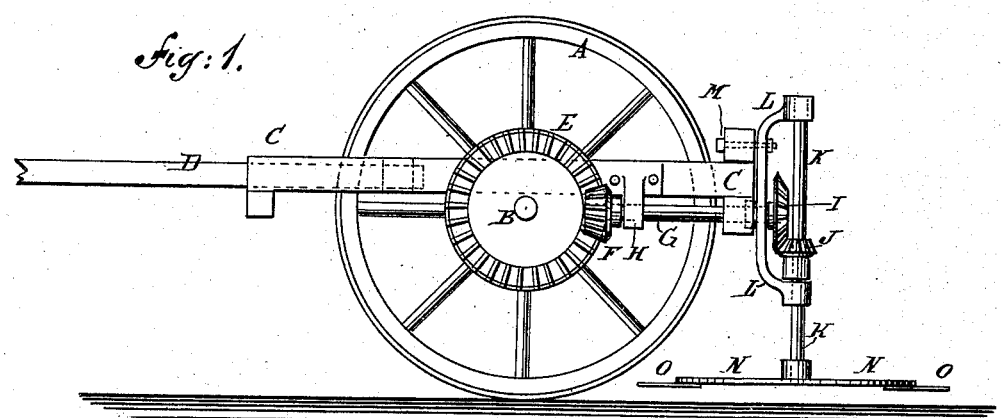
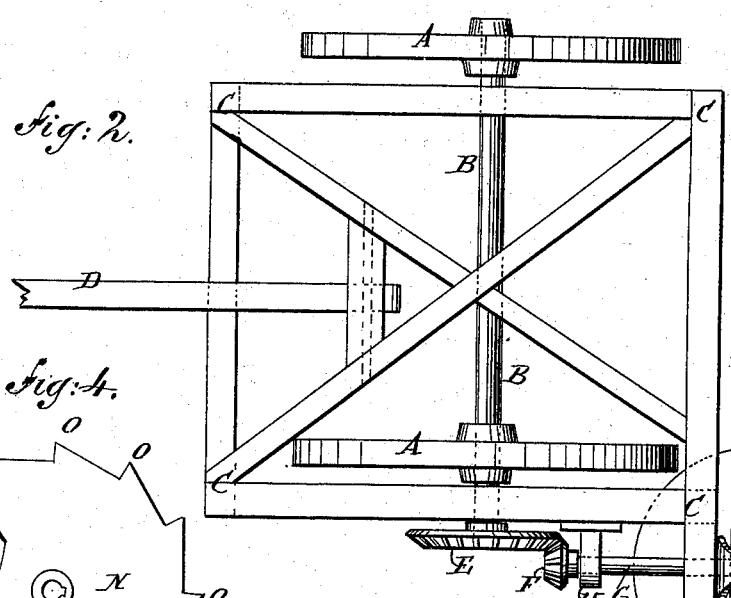
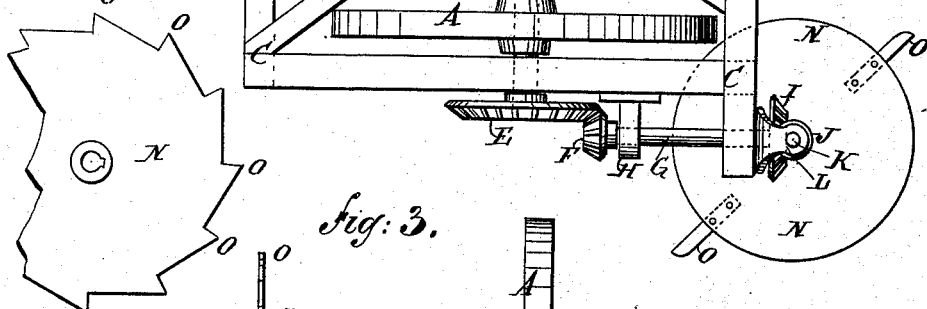
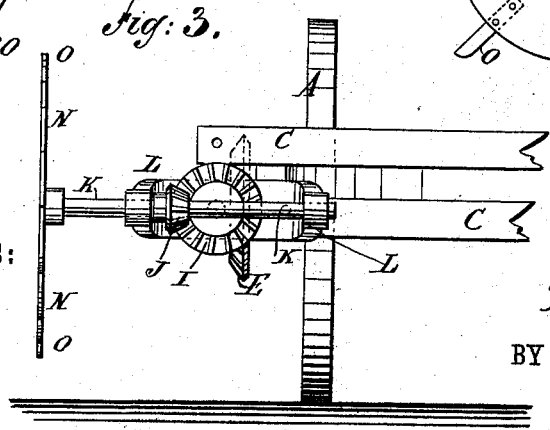
WITNESSES:
Chas. Nieu.
C. Sedgwick
INVENTOR:
W. McLaughlin
BY
ATTORNEYS.

United States Patent Office.

WILLIAM McLAUGHLIN, OF AUCKLAND, NEW ZEALAND.

HEDGE-TRIMMER.

SPECIFICATION forming part of Letters Patent No. 322,193, dated July 14, 1885.

Application filed November 11, 1884. (No model.) Patented in New Zealand August 15, 1884, No. 888, and in Queensland, September 6, 1884, No. 23.

*To all whom it may concern:*

Be it known that I, WILLIAM MCLAUGHLIN, of Auckland, New Zealand, have invented certain new and useful Improvements in Machines for Cutting Scrub, Trimming Hedges, and other Similar Uses, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a plan view of the same. Fig. 3 is a rear elevation of a part of the same shown as arranged for use as a hedge-trimmer. Fig. 4 shows another form of cutter.

The object of this invention is to facilitate the cutting of brush, rushes, sugar-cane, and other vegetation, the trimming of hedges, and doing other similar work.

The invention consists in a mechanism for cutting brush and trimming hedges, constructed with a carriage and a disk provided with two or more cutters, and connected with the drive-wheel of the carriage by two pairs of beveled gear-wheels and two shafts, whereby the said disk will be driven at great speed by the advance of the machine.

The shaft carrying the disk, the shaft connected with the drive-wheels, and their connecting gear-wheels are connected with each other and with the frame of the carriage by an adjustable bracket and fastening-bolts, whereby the said disk-carrying shaft can be adjusted in a vertical or a horizontal position, as will be hereinafter fully described, and specifically set forth in the claim.

A are the drive-wheels, the axle B of which revolves in bearings attached to the frame C. The frame C is made with two rear cross-bars, and at its forward end is attached the tongue D, to which the draft is applied. One or both of the wheels A are placed within the side bars of the frame C.

To one end of the axle B is attached a large beveled gear-wheel, E, the teeth of which mesh into the teeth of a small beveled pinion, F, attached to the forward end of the shaft G. The shaft G revolves in bearings H, attached to the side bar of the frame C, and has attached to its rear end small beveled gear-wheel I, the teeth of which mesh into the teeth of a smaller beveled pinion, J, attached to the shaft K. The shaft K revolves in bearings in the outwardly-bent ends of the bar or bracket L, which is mounted and turns upon the rear part of the shaft G. One arm of the bracket L has holes formed in it to receive the bolts M, by which the said bracket is secured to the frame C, and is thus held in position upon the shaft G.

To the end of the shaft K is attached the center of a circular disk, N, to the edges of which are attached or upon it are formed two or more knives or cutters, O, as the character of the substance to be cut may require.

When scrub, sugar-cane, or other similar substances are to be cut, the disk N is adjusted in a horizontal position, as shown in Figs. 1 and 2, the perforated arm of the bracket L being bolted to the rear cross-bars of the frame C.

When the machine is to be used as a hedge-trimmer, the bolts M are taken out and the bracket L turned upon the shaft G to bring the disk N into a vertical position, as shown in Fig. 3, the perforated arm of the said bracket L being bolted to the rear cross-bars of the frame C.

I am aware that hedge-trimmers have been provided with a rotary disk having knives secured thereon, the shaft of said disk being mounted in an adjustable bracket, to change the angle of said cutting-disk, and I do not claim such, broadly, as of my invention.

Having thus described my invention, what I claim as new, and desire to secure by Letters Patent, is—

In a machine for cutting brush and trimming hedges, the combination of the frame C, wheels A, axle B, provided with the gear-wheel E, the longitudinal shaft G, mounted in bearings on one side of the frame and provided with the pinion F and gear-wheel I, the bracket L, mounted on the shaft G, the shaft K, mounted in bearings in said bracket outside of said gear-wheel I, and provided inside of said bracket with the pinion J, meshing with said wheel I, the cutting-disk N O, fixed to the shaft K, and the adjusting-bolt M, passing through the bracket L and a hole in the frame C, to adjust the cutter in different positions, substantially as described.

WILLIAM McLAUGHLIN.

Witnesses:
W. J. EDWARDS,
A. JONES.